United States Patent
Friedrich

(10) Patent No.: US 7,702,150 B2
(45) Date of Patent: Apr. 20, 2010

(54) METHOD FOR DETERMINING A P-QUANTILE FOR THE PIXEL LEVELS, IN PARTICULAR THE GRAYSCALE LEVELS, OF A DIGITAL IMAGE

(75) Inventor: Roland Friedrich, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 784 days.

(21) Appl. No.: 11/541,415

(22) Filed: Sep. 29, 2006

(65) Prior Publication Data

US 2007/0081722 A1 Apr. 12, 2007

(30) Foreign Application Priority Data

Sep. 30, 2005 (DE) ........................ 10 2005 047 051

(51) Int. Cl.
*G06K 9/00* (2006.01)
(52) U.S. Cl. ........................ 382/168; 382/169; 382/274; 382/275
(58) Field of Classification Search ................. 382/168, 382/169, 274, 275; 345/589, 640, 690; 348/586; 375/E7.226; 600/443; 378/41
See application file for complete search history.

(56) References Cited

U.S. PATENT DOCUMENTS

| 6,249,603 | B1 * | 6/2001 | Rucklidge | 382/169 |
| 6,310,983 | B1 * | 10/2001 | Rucklidge | 382/275 |
| 7,330,600 | B2 * | 2/2008 | Nishida | 382/274 |

OTHER PUBLICATIONS

U.S. Appl. No. 11/402,329, filed Apr. 11, 2006, Siemens AG.

* cited by examiner

*Primary Examiner*—Anh Hong Do

(57) ABSTRACT

Frequency distributions are particularly difficult to analyze by means of image processing systems if the digital images to be processed are divided into disjoint image areas and signal processors associated with each image area perform pre-processing of the pixel data. To determine a total frequency distribution, a large number of corresponding table entries must be transferred to a central processor. The invention accordingly proposes that the individual signal processors perform summation of the individual entries in a frequency distribution to obtain a cumulative frequency table. To find a p-quantile, not all the entries of the cumulative frequency tables need to be transferred to the central processor. If the latter in particular performs interval nesting, a value from the cumulative frequency tables only needs to be interrogated a manageable number of times in order to obtain a single entry in the total image cumulative frequency table.

9 Claims, 2 Drawing Sheets

METHOD FOR DETERMINING A P-QUANTILE FOR THE PIXEL LEVELS, IN PARTICULAR THE GRAYSCALE LEVELS, OF A DIGITAL IMAGE

CROSS REFERENCE TO RELATED APPLICATIONS

This application claims priority of German application No. 10 2005 047 051.3 filed Sep. 30, 2005, which is incorporated by reference herein in its entirety.

FIELD OF THE INVENTION

The invention relates to a method for determining a p-quantile for the pixel levels, in particular the grayscale levels, of a digital image.

BACKGROUND OF THE INVENTION

In the prior filed but later published patent application with the official application number 10 2005 017 489.2, the dose data value assigned to the p-quantile of the image is used as the actual value for the dose or dose rate in an X-ray image.

A p-quantile is a value obtained from a frequency distribution, assuming a frequency distribution in which a plurality of values of a particular quantity are assigned a particular frequency. If the frequency distribution has n entries in total, the p-quantile (with 0<p<1) is the value at which n*p entries in the frequency distribution are entries for a lesser (or equal) value, and (1−p)*n entries pertain to values which are greater than the p-quantile.

When looking for the p-quantile, one is therefore looking for a value which divides the frequency distribution in a particular ratio.

In x-ray systems according to the prior art, as a rule the image is not now analyzed as an entity.

Instead, the image is divided into disjoint areas, typically into four disjoint image areas. Each of these image areas is assigned a (digital) signal processor. The signal processors allow parallel processing of pixel data from the respective image areas, so that a central processor only receives data from the signal processors on the basis of which it can "complete" image analysis. In other words, either preparation for image analysis or even part of image analysis takes place in the signal processors, and the combining of the data obtained by the signal processors is then the responsibility of a central processor (LCPU, Local Central Processing Unit).

However, this division of responsibilities among different signal processors in modern x-ray machines is a priori obstructive to determining a p-quantile. As the p-quantile is not a computationally determined value but a statistically determined value, it requires information concerning the frequency distribution.

As a first step, the individual signal processors would each normally be used to generate a frequency table in which, for the digital image, every pixel value is assigned the frequency of its occurrence in the image area associated with the signal processor.

These frequency tables would then be combined to form a total frequency table. As the pixel levels are predefined as such, only the assigned table entry needs to be added in each case.

The reason for associated problems is that modern x-ray imaging systems provide a large number of possible gray levels (which correspond to dose levels). 16 bits are typically used for the gray levels. Also in other imaging systems the number of pixel levels (these can also be color levels) is very high.

16 bits mean that there are $2^{16}$ grayscale levels, i.e. approximately 64000 grayscale levels.

However, this also means that the frequency table has 64000 entries.

If the frequency table is to be transferred from the signal processor to the main processor, four times 64000 value assignments must be transferred. However, each individual data transfer requires approx. three clock pulses. If data analysis with determination of the p-quantile is to take place in real-time, this is critical in x-ray systems in which e.g. 30 images are generated per second. Because of the large number of data entries to be transferred for the frequency table, real-time analysis is no longer guaranteed.

SUMMARY OF THE INVENTION

The object of the invention is to demonstrate how a p-quantile can be determined preferably in real-time together with generation of the images even in the case of a large number of pixel levels.

To achieve this object, the invention proposes a method as claimed in the claims.

According to the inventive method, the signal processors compute a cumulative frequency table from the frequency table in each case. A cumulative frequency table is a table in which, for the digital image, each pixel level is assigned the sum of the frequencies of the occurrence of itself and of lower pixel levels. The cumulative frequency table is preparatory to finding a p-quantile.

The crux of the invention is now that not all the entries in the cumulative frequency table need to be added for every pixel level from the individual signal processors. Rather the central processor selectively interrogates individual entries in the cumulative frequency table. For this purpose it selects individual pixel levels and only interrogates the entries in the cumulative frequency table for the pixel levels selected. These are summed. On the basis of the summed entries, it can be determined for each entry whether or not the p-quantile is near. In other words the pixel levels are selected such that the central processor successively approximates a pixel level corresponding to the p-quantile until it eventually finds the p-quantile. "Successively" is here to be taken to mean that a particular method is provided which predefines the selection, and wherein it is ensured by the method that at some time approximation to the p-quantile take place. "Successively" does not rule out that two chronologically successive interrogations are sometimes closer to the p-quantile and sometimes somewhat removed from same, as long as it is ensured that the p-quantile is approximated in a chronologically successive manner at some time.

The specified selection method can use in particular interval nesting.

Preferably two intervals are used here. In other words, for interval nesting the central processor divides a pixel value interval into a lower and a higher interval. (As a rule it initially proceeds on the basis of the total interval of pixel values). For the highest pixel value of the lower interval or the lowest pixel value of the higher interval it interrogates the individual cumulative frequencies and sums same in order to obtain the total image cumulative frequency for the particular pixel value. The central processor then performs a comparison of the total image cumulative frequency with n*p, also taking into account where necessary the previously determined total image cumulative frequencies, in order to determine whether or not it approximates to the p-quantile. In other words it checks whether it has already found the p-quantile. If this is not the case, it continues interval nesting with the lowest or the highest interval as the pixel value interval to be divided.

It will select the lower interval if the last determined total image cumulative frequency is greater than n*p, i.e. the associated pixel value is above the p-quantile. It will select the higher pixel value interval if the last determined total image cumulative frequency is less than n*p. It will detect on the basis of a comparison with hitherto determined total image cumulative frequencies that it has already found the p-quantile if it discovers a value greater than n*p for a particular pixel value and a value less than n*p for the adjacent lesser pixel value. The p-quantile is than effectively "within" the total cumulative frequency for the pixel value, and the p-quantile sought is the higher of the two adjacent pixel values mentioned.

BRIEF DESCRIPTION OF THE DRAWINGS

The invention will now be described in greater detail with reference to the accompanying drawings in which.

DETAILED DESCRIPTION OF THE INVENTION

Figure 1:
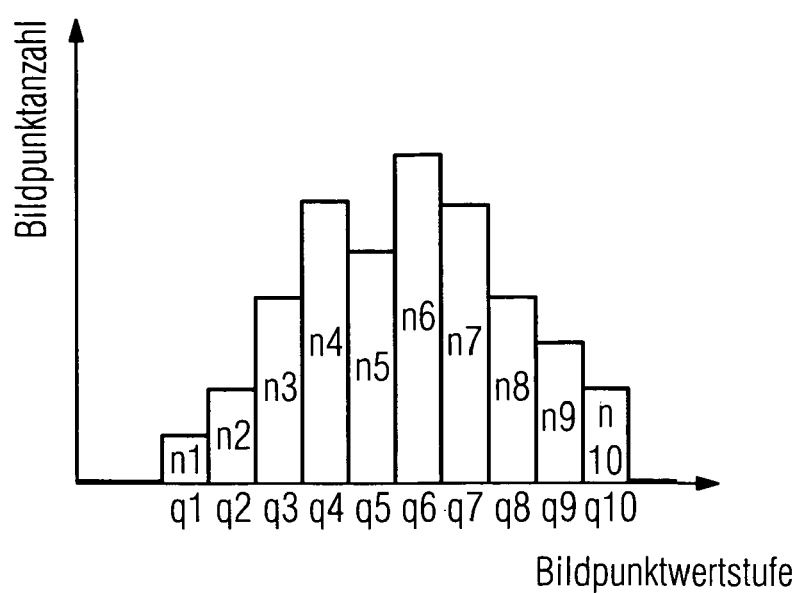
FIG. 1 is a graphical representation of a frequency table of the type used for the present invention.

FIG. 1 shows a graphical representation of a frequency distribution known as a histogram. The number of pixels is plotted against a pixel level in each case. The pixel level is a quantity specified in discrete values q1 to q10. FIG. 1 plots the number of pixels associated with the pixel level in a particular image area. For example, the image area is a quarter of the total image if, as is usual in the prior art, said image is subdivided into four disjoint image areas to which a digital signal processor (DSP) is assigned in each case.

In each digital signal processor there is generated a frequency table relating to the number of pixels as a function of the pixel level for the associated image area in each case. This can be graphically represented as shown in FIG. 1.

Although a p-quantile can be determined for the shown frequency distribution assigned to an image area, the p-quantile for the total image cannot be inferred from the p-quantile for individual image areas. In particular—unlike in the case of average values—computational analysis of the individual p-quantile to determine the total p-quantile is not possible.

The invention now proposes to create, for each image area, another table in which each pixel level is assigned the sum of the frequencies of the relevant number of pixels for the pixel level and for lower pixel levels. Such a table is graphically illustrated in FIG. 2.

Thus the lowest pixel level q1 is again assigned the pixel count n1.

The pixel level q2 is now assigned its own pixel count n2 and the pixel count n1 for the lower pixel level q1.

Correspondingly the pixel level q3 is assigned the pixel count n3 for its own pixel level and the pixel counts n1 and n2 for the lower values q1 and q2. The sum need not be redetermined each time, but the value from the frequency table for the next higher pixel level can be added to the cumulative frequency determined for a particular pixel level in order to obtain the new cumulative frequency for this next higher pixel level. For example, for the pixel count n1+n2+n3+n4, which is assigned to the pixel level q4 in the cumulative frequency graph according to FIG. 2, only the pixel count n5 from the graph according to FIG. 1 is added in order to obtain the pixel count for this next higher level q5.

The use of cumulative frequencies is preparatory to finding a p-quantile. A p-quantile is deemed to be the pixel level below which there are n*p pixels. In grayscale values, q1 would be, for example, the color black and q10 the color white. If q7 were determined as the p-quantile, this would mean that n*p of the pixels are darker than or as dark as the gray level q7.

Figure 2:
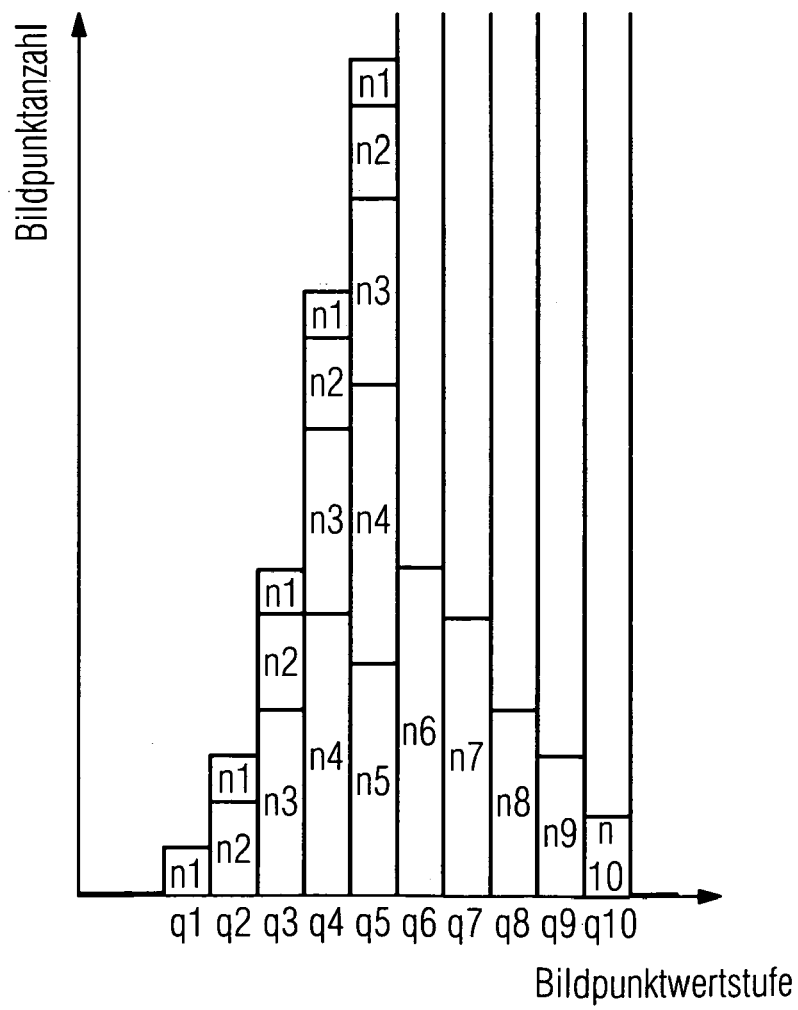
FIG. 2 is a graphical representation of a cumulative frequency table of the type used for the present invention.
Figure 3:
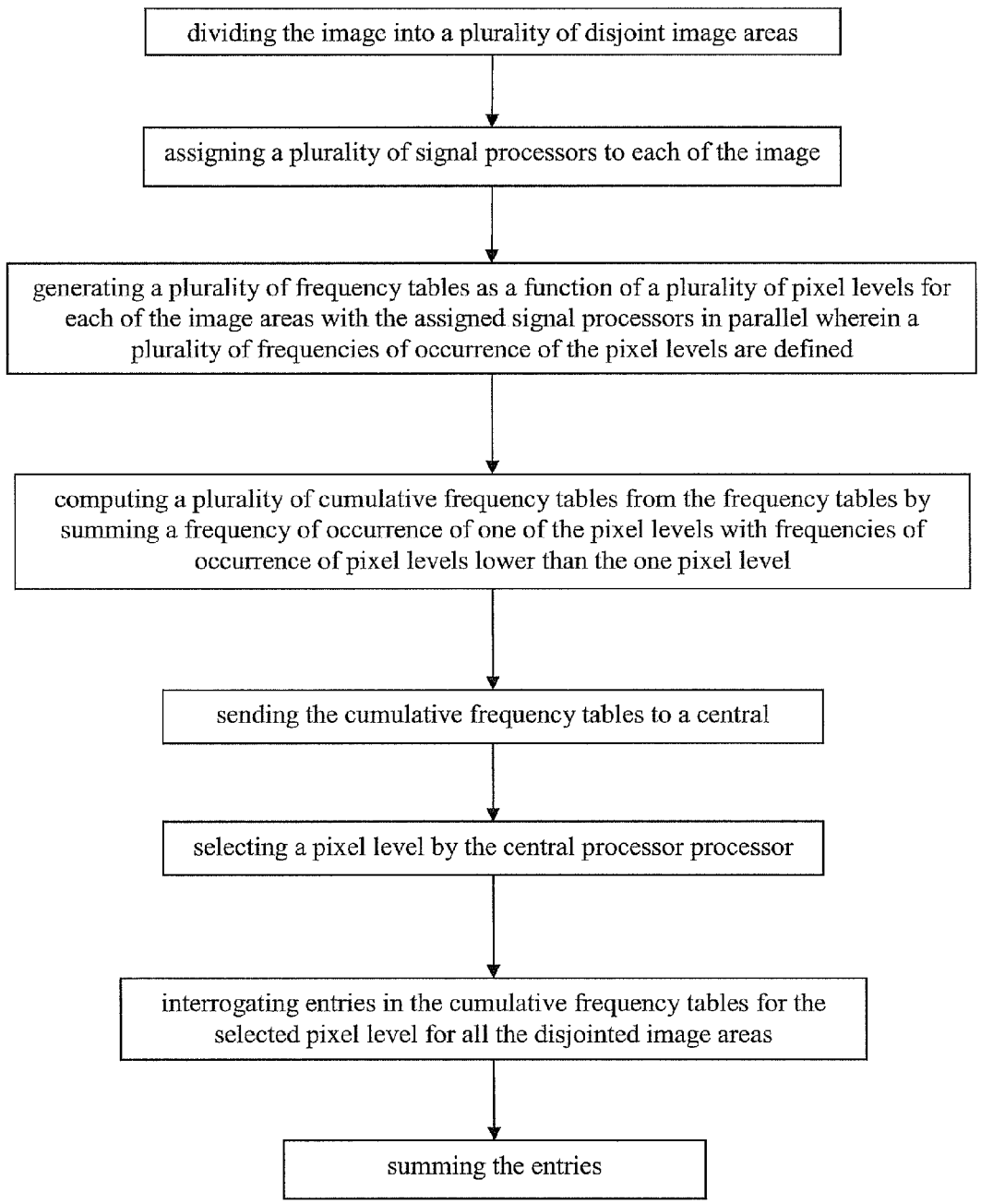
FIG. 3 is a flowchart of the method steps of the present invention.

Even if the representation according to FIG. 2 prepares the finding of a p-quantile, it should be noted that until now the cumulative frequency table has been individually generated for different image areas in each case, but there is no cumulative frequency table for the total image.

Although it would be possible to generate a cumulative frequency table for the total image by adding the individual entries to the pixel levels q1 to q10 from the individual cumulative frequency tables, the amount of data to be transferred in that case is too high for handling in real-time. Although only ten pixel levels q1 to q10 are shown by way of example, in reality there may be up to 64000 pixel levels.

In practical terms a p-quantile can now be determined by sampling. In other words, the central processor interrogates particular entries in the individual tables, each associated with particular image areas, and sums same. It can then ascertain whether the relevant pixel level is too high or too low, i.e. whether it is necessary to go higher or lower to find the p-quantile.

Interval nesting is the preferred method here.

For example, the total number of pixel levels q1 to q10 is divided into two parts, namely a first interval q1 to q5 and a second interval from q6 to q10. At the boundary between the two intervals it must now be determined whether said boundary is higher or lower than the p-quantile, or whether the p-quantile has been hit. For example, the lowest pixel value of the higher interval, the pixel value q6, is used. The central processor now interrogates the individual digital signal processors only for the entry for q6. It obtains four quantities which it sums. It therefore obtains the entry value $N6_{tot.}$ for the total image cumulative frequency table. A check is now carried out to ascertain whether $N6_{tot.}$ is less than n*p. The p-quantile is known to be defined as the pixel level at which in total n*p values are lower than (or equal to) the relevant pixel level. If $N6_{tot.}$ is now less than n*p, this means that the p-quantile is to the right of q6, i.e. in the right-hand interval q6 to q10. For the interval nesting described, re-division of the interval q6 to q10 is therefore performed. It is divided into two intervals, e.g. q6 to q8 and q9 to q10. As the lower interval now contains three pixel values and the higher only two pixel values, in the next step the total image cumulative frequency is determined for the pixel value q8. For this purpose, the entries from the cumulative frequency tables for the four individual image areas are interrogated by the individual digital signal processors in each case. They are then summed, yielding the value $N8_{tot.}$ It is now checked whether $N8_{tot.}$ is greater or less than n*p. It will be assumed here that $N8_{tot.}$ is greater than n*p.

The p-quantile has therefore not yet been found with certainty.

The interval from q6 to q8 is now again divided into two intervals, namely the lower interval q6 to q7 and the higher interval which comprises only q8.

As the low interval contains two pixel levels, the pixel level for the lower interval is taken as the starting point. The value for q7 has indeed also hitherto been absent. The digital signal processors are now interrogated by the central processor to ascertain the values for q7, the individual entries in the cumulative frequency tables according to FIG. 2 are fed to the central processor and are summed, yielding the value $N7_{tot.}$. It is now again checked whether $N7_{tot.}$ is greater or less than n*p.

$N7_{tot.}$ now be less than n*p.

As $N8_{tot.}$ was greater than n*p, the p-quantile is actually precisely between the two. The p-quantile corresponds to a pixel which therefore has the higher pixel level q8, because then n*p pixels are darker than or as dark as the pixel in question (or rather, expressed in dose data value terms, have the same dose or a lower dose than said pixel).

During interval nesting, the quantities $N6_{tot.}$, $N8_{tot.}$ and $N7_{tot.}$ have therefore been successively determined. The penultimate value has emerged as the value which is assigned to the p-quantile (maximum).

This interval nesting has proceeded on the basis of ten pixel levels.

In the prior art, the number of pixel levels is normally a power of 2, e.g. there are $2^{16}$ pixel levels. It is then possible to divide the pixel value interval precisely into two equal-sized pixel value intervals step by step until two adjacent pixel levels are hit upon. The number of steps is then equal to the power of 2 specifying the number of pixel levels. In the case of $2^{16}$ pixel levels, 16 divisions are therefore required.

Accordingly, a request is sent 16 times to the digital signal processors, and four pixel values are transferred 16 times. The total of 64 transferred pixel values is relatively manageable. In particular, not all $2^{16}$ table entries need to be transferred by each of the four signal processors, enabling the p-quantile to be obtained in real-time, real-time meaning here that an x-ray angiography system takes e.g. 30 images per second and accordingly the p-quantile is determined for the 30 images without delay. The invention is not limited to image analysis in x-ray systems. It can be used whenever the image is divided into disjoint image areas and the pixel-data in the individual image areas is pre-processed in a time-parallel manner by signal processors each assigned to an image area, a central processor then merely completing image analysis.

The invention claimed is:

1. A method for determining a p-quantile for a pixel level of a digital image, comprising:
   employing a plurality of signal processors for:
   dividing the image into a plurality of disjoint image areas;
   assigning a plurality of signal processors to each of the image areas;
   generating a plurality of frequency tables as a function of a plurality of pixel levels for each of the image areas with the assigned signal processors in parallel wherein a plurality of frequencies of occurrence of the pixel levels are defined;
   computing a plurality of cumulative frequency tables from the frequency tables by summing a frequency of occurrence of one of the pixel levels with frequencies of occurrence of pixel levels lower than the one pixel level;
   employing a central processor connected to the signal processors for:
   sending the cumulative frequency tables to a central processor;
   selecting a pixel level by the central processor;
   interrogating entries in the cumulative frequency tables for the selected pixel level for all the disjointed image areas; and
   summing the entries,
   wherein the central processor successively selects a successive pixel level and approximates the successive selected pixel level corresponding to the p-quantile until the p-quantile is determined based on the summed entries.

2. The method as claimed in claim 1, wherein the central processor selects the pixel level based on an interval nesting.

3. The method as claimed in claim 2, wherein the central processor divides an interval of the plurality of pixel levels into a lower and a higher interval.

4. The method as claimed in claim 2, wherein the central processor interrogates and sums cumulative frequencies from the cumulative frequency tables for a highest pixel level of the lower interval or a lowest pixel level of the higher interval for all the disjointed image areas in order to obtain a total cumulative frequency for the image.

5. The method as claimed in claim 4, wherein the central processor compares the total cumulative frequency for the image with a number.

6. The method as claimed in claim 4, wherein based on the comparison result the central processor:
   checks if the p-quantile is determined, or
   continuously performs the interval nesting with the lower or higher interval as a further pixel level interval to be divided if the p-quantile is not determined.

7. The method as claimed in claim 5, wherein the number equals the highest pixel level of the lower interval or the lowest pixel level of the higher interval multiplied with the total cumulative frequency for the image of the highest or the lowest pixel level.

8. The method as claimed in claim 1, wherein the method is for determining a p-quantile for a grayscale level.

9. A device for determining a p-quantile for a pixel level of a digital image, comprising:
   a plurality of signal processors each assigned to one of a plurality of image areas divided from the digital image which:
   generates a plurality of frequency tables as a function of a plurality of pixel levels for each of the image areas with the assigned signal processors in parallel wherein a plurality of frequencies of occurrence of the pixel levels are defined,
   computes a plurality of cumulative frequency tables from the frequency tables by summing a frequency of occurrence of one of the pixel levels with frequencies of occurrence of pixel levels lower than the one pixel level; and
   a central processor connected to the signal processors which:
   receives the cumulative frequency tables from each of the signal processors,
   selects a pixel level,
   interrogates entries in the cumulative frequency tables for the selected pixel level for all the divided image areas, and
   sums the entries,
   wherein the central processor is adapted to successively select a successive pixel level and approximate the successive selected pixel level corresponding to the p-quantile until the p-quantile is determined based on the summed entries.

* * * * *